Patented Mar. 19, 1940

2,193,842

UNITED STATES PATENT OFFICE 2,193,842

FERTILIZER CONTAINING SELECTIVELY CALCINED DOLOMITE

Clarence R. Rex, Toledo, Ohio

No Drawing. Application July 20, 1933,
Serial No. 681,395

1 Claim. (Cl. 71—53)

This invention relates to modifying the physical and chemical properties of limestone carrying magnesium.

This invention has utility in the treatment and production primarily of magnesian limestone subjected to heat treatment in adapting for soil correction in cooperating for improving agricultural values.

Raw material

In carrying out the invention herein, dolomite or magnesian limestone may be quarried or mined and handled in the treatment and for the product hereunder. In the event the treatment is to be heat treatment in the shaft type of kiln, the stone may be in size under 10 and over 6 inches. In shaft kilns, the run may even be from 4½ to 6 inch stone. However, for rotary or tunnel type kilns, stone may more desirably run from 2 to 4 inches or even down from ¾ inch to 2 inches; while for a Herreshoff furnace, the size is desirably ¾ inch and under, even to dust.

Heat treating

The fuel may be solid, liquid, or gaseous. In shaft kiln operations, say with coal, firebox temperature may run from 1000° C. to 1150° C. In carrying out the invention herein, importance resides in the character and extent of the burning. With the dolomitic stone such as found in the Northwestern Ohio fields, it is desirable to effect the change in the region of 850° C. to 970° C. The temperature adopted for the treatment is not such as may be effective for dissociation of the calcium carbonate to calcium oxid by driving $CO_2$ therefrom.

However, in the conduct of the treatment, it is aimed to have the operation one effective to change the molecular construction of magnesium carbonate to magnesium oxid by the separation of $CO_2$ therefrom, and desirably leaving from 5 to 8 per cent magnesium carbonate, at least at the time the material is removed from the treating zone of the kiln.

For 6 to 10 inch stone, this heat treating interval may run 1½ to 2 hours; while for the 4½ to 6 inch stone, 1 hour should suffice. In the smaller sizes, less time interval is required. In this treatment, by dropping the stone from the heat treating zone in a step toward normal atmospheric condition to lodge in a storage chamber therebelow, there may be a further removal of carbon dioxid from the magnesium carbonate. However, it is desirable to have such not extend into dissociation of carbon dioxid from the calcium carbonate. In conducting this operation, it has been found that, at the temperatures herein disclosed, there is such a release of carbon dioxid from the magnesium carbonate that this carbon dioxid serves as a heat dissipation means effective against a material rise in temperature of the stone undergoing treatment. As long as this velocity of carbon dioxid removal is effective, there does not seem to be any tendency for the temperature of the stone to build up more nearly toward the temperature of disintegration of calcium carbonate.

However, as the rate of carbon dioxid removal from the magnesium carbonate decreases, there is the tendency for the temperature of the stone to absorb heat, and such is the approach to critical condition, wherein it is desirable to act hereunder in removing the stone from the heat treating zone or from tendency to further increase the temperature. In the event some of the stone should have acquired excess temperature, due to lack of removal rate for the heat, there is approach to the condition favorable for conversion of the calcium from the carbonate to the oxid.

Such calcium oxid may be separated from the mass of the stone by rumbling, for it readily crumbles off with a freedom not characteristic of the magnesium oxid, magnesium carbonate, nor calcium carbonate. Furthermore, as this excess temperature is superficial, this rumbling removal is quite readily accomplished. Instead of rumbling, a spray may be applied to the heat-treated stone while hot—100° C. to 400° C.—and the calcium oxid and calcium hydrate will readily crumble off, and such crumbly material may be readily separated from the stone.

Subdividing

Notwithstanding the heat-treated stone be of the coarse sizes as hereinbefore discussed, there is not necessity for crushing, as it is only necessary to subject to hammer mill and subsequent ball mill operation and the product is thus readily reduced to have 100 per cent pass through a 30 mesh to the inch sieve; 99.1 per cent through a 50 mesh per inch; 92 per cent through a 100 mesh per inch; 71.5 per cent through a 200 mesh per inch; and 67 per cent through a 300 mesh per inch. These sizes have been checked with some ten car loads of material; the material averaging twenty tons to the car.

Physical properties

It is thus seen that the product hereunder is essentially calcium carbonate and magnesium oxid with possibly a very minor quantity of magnesium carbonate. This heat treatment has produced a product having markedly different physical properties from the raw stone. Its specific gravity is lowered, in the instance of the stone of Northwestern Ohio, from 4.1 to an apparent specific gravity of 2.65. From a hardness of the raw stone from 3½ to 4, such is reduced to 1.6 to 2. Resistance to crushing: the raw stone, 17,000 to 19,000 pounds per square inch; for the treated stone, 6,000 to 9,000 pounds per square inch.

Freeze and thaw tests show the raw stone holding up for 155 cycles in a 24 hour interval; while the treated stone shattered in 16 cycles of freeze and thaw in an interval of 24 hours. The absorption rate for the raw stone averaged 1.8 per cent in a six day soaking test; while that for the treated stone averaged 13.85 per cent, in taken-up moisture while submerged in water.

*Chemical properties*

The calcium carbonate seems to be adjusted in some manner, while the magnesium oxid is of a form which may be termed magnesium oxid A as distinguished from magnesium oxid B. In the instances given consideration, magnesium oxid A has specific gravity 3.2 and magnesium oxid B has specific gravity 3.7. Magnesium oxid A absorbs moisture more readily to form magnesium hydrate which readily absorbs carbon dioxid. These changes occur with more difficulty in the magnesium oxid B. Magnesium oxid A, uniting slowly with water, forms a gelatinous mass, which is not true, to the same degree, of magnesium oxid B. Furthermore, this magnesium oxid A, in the reactions hereunder, changes to the magnesium hydrate which permits the formation of magnesium bicarbonate or basic carbonate. These are the more natural stages of change arising in soil as exposed to weathering conditions. The hydrate and this basic magnesium carbonate are active in their relation to soil promotion changes, and are more alkaline and of greater solubility than the normal or full carbonate of magnesium. In fact, in testing with 100 cc. of water, the basic carbonate dissolves .04 gram, while the normal carbonate of magnesia has a solubility of but .0106 for water at 15.5° C.

This magnesium oxid establishes a favorable condition in soil nitrification and is effective for weight to a greater extent than calcium carbonate. In considering neutralizing power of ground high calcium limestone as 100 per cent, this heat-treated magnesian limestone may readily have a neutralizing power of 135 to 145 as to an equal weight of the ground limestone of like mesh screening or like size. It is to be understood that as the particles are reduced in size, there is an increase in the exposed area of the particles per unit weight, and accordingly, an increase in the facility for responding to weathering action and to soil correction.

In the carrying out of growth tests hereunder and soil treated with the product herein disclosed, there is evidenced a definite power for effecting chemical change as possessed by the product and the magnesia in the product for combination in the plant growth. A 10 per cent solution of hydrochloric acid dissolves more rapidly heat-treated magnesian limestone hereunder than dolomitic, magnesian limestone, calcite or high calcium ground limestone. The solubility reaction of the oxid in its changes, seems to have a specific power of absorbing ammonia with less tendency to attack or decompose nitrogenous compounds, especially nitrogenous organic compounds, and there is accordingly retained in the soil, even for manures, the nitrogenous values.

Furthermore, this product, although heat-treated, does not have a deleterious action upon seed, if it be applied with the seed or at planting, nor does it react in a detrimental way as to manure or soil humus.

In fact, it may be applied with super-phosphate fertilizer with no hazard for conversion thereof to tri-phosphates. It may even be used with ammonium sulphate with no objectionable liberation of ammonia therefrom.

This relatively slow reaction being a reaction which retains a degree of control for the soil, has been found to result in an immediate increase in the number of bacteria and the rate of conversion of organic nitrogenous material of the soil into ammonia. This is in excess of that experienced with oxid treatment and in excess of raw stone or hydrated lime. In this connection, the nitrates in parts per million have checked as to the treated material, 54.82, while for dolomite, 44.77. It is thus seen that there is an advantage of nearly 25 per cent for treated material in the effective nitrification action. In crops, it has been determined there is appreciable presence of calcium as well as magnesia in the ash. In connection with clover crops, wherein the check has been made of untreated raw dolomite for ash substance therein, there has been found in the tops untreated, 1.24 to 1.52 range, while in the roots, 2.60 to 2.86. For the clover as treated with ground dolomite or raw stone, the tops have been found to run 1.54 to 1.96, while for the roots, 2.68 to 3.46. In the treated, the tops have run 2.00 to 2.26, while the roots have run 3.96 to 4.32. These are dry weights and grams of original identical samples as to mass. This averaged as to total ash for the untreated 4.29 as against, for raw or ground dolomite 4.72 and the treated ash 5.55 per cent.

The ash composition of the untreated ran 29.10 per cent for calcium oxid as against 8.76 for magnesium oxid. For the raw dolomite, calcium oxid 32.15 as against 9.41 for the magnesium oxid. The untreated soil hereunder was of course not neutralized. The dolomite was used in sufficient quantity to neutralize soil acidity as in the product hereunder. The ash of the product ran 36.44 calcium oxid to 14.70 for the magnesium oxid. It is thus noted there is an increase in the calcium and magnesia over the untreated as to the dolomite and a still further increase as to the content in the treatment with the product hereunder. The magnesium proportion in the soil treated with the product hereunder is materially greater as to the calcium oxid than in the dolomite treated soil.

It is believed in the operations hereunder, that the magnesium oxid, in its soil reactions, leaves more carbon dioxid of the soil free to react to the phosphates and potassium compounds than is the case with calcium hydrate-containing products. Furthermore, it seems there is no occasion for the formation of hydro-carbonates as distinguished from the basic bicarbonate of magnesium. It is noted in this heating treatment in separating the calcium dioxid from the magnesia, there is an increase in the calcium carbonate concentration, and this reduction may be as much as 22 per cent of the weight of the raw material. In the combination of the magnesium hereunder with calcium, there is avoided any toxic properties, and as hereinbefore pointed out, there is in the experience hereunder, beneficial attributes following from the heat treatment.

Accordingly, it is to be seen from the foregoing that, in the heat treatment hereunder, there is produced a stabilized substance of this calcium carbonate, magnesium oxid, which as stored in bags or sacks is not subject to disintegration or attack of the container, or by swelling to break the container. It seems to be in the form of a solid solution with properties of availability for soil reaction and weathering, and that this availability is one which may have an extended duration.

This means that, even though there be a relatively wet season, this soil correction acts, not only in the supply as itself, but for releasing other food elements for vegetation growth. An instance of this involves a patch treated with ordinary agricultural lime, largely calcium carbonate with a little calcium oxid, as against a patch wherein the soil was treated with this material, which showed oats as simultaneously planted, with a height of 8 inches in the normal agricultural lime patch, and such oats 2 feet high in the patch treated hereunder.

These values extend, not only to the growth but to the greater length of seed bearing portion of the stem for more seeds. The provision herein of magnesium answers the demand of the plants for the seeds, fruits and flowers, as well as roots and tubers, which carry magnesium to a greater extent than the stems, leaves and wood. This magnesium has a value in its association with nitrogen for protein formation and with chlorophyl in the formation of starch and reacting for vitamin production. The filler of this case is a development from and a continuation in part of the disclosure in C. R. Rex Patent 2,048,967 of July 28, 1936, having partial continuity going back to S. N. 123,253 filed July 17, 1926, as well as C. R. Rex Patent 1,845,339 of Feb. 16, 1932.

What is claimed and it is desired to secure by Letters Patent is:

A fertilizer comprising a mixture of a fertilizing salt selected from the class consisting of superphosphates and ammonium salts with dolomite which has been selectively calcined in a manner to form a product the calcium content of which is present entirely in the form of $CaCO_3$ free of CaO and the magnesium content of which is largely in the form of MgO with 5%–8% thereof as $MgCO_3$, said selectively calcined dolomite being ground to approximately 100–300 mesh.

CLARENCE R. REX.